United States Patent

[11] 3,619,021

| [72] | Inventors | Klaus Biedermann<br>Unterhaching;<br>Friedrich Bestenreiner, Gruenwald, both of<br>Germany |
|---|---|---|
| [21] | Appl. No. | 27,038 |
| [22] | Filed | Apr. 9, 1970 |
| [45] | Patented | Nov. 9, 1971 |
| [73] | Assignee | AGFA-Gevaert Aktiengesellschaft<br>Leverkusen, Germany |
| [32] | Priority | Apr. 11, 1969 |
| [33] | | Germany |
| [31] | | P 19 18 375.6 |

[54] METHOD OF MAKING A DIFFUSING LAYER
6 Claims, 5 Drawing Figs.

[52] U.S. Cl. ........................................... 350/3.5,
161/3.5
[51] Int. Cl. ........................................... G02b 5/02
[50] Field of Search ........................................... 350/3.5,
162; 161/3.5

[56] References Cited
UNITED STATES PATENTS
3,045,531  7/1962  Prescott ..................... 350/162
OTHER REFERENCES
Upatniers, Applied Optics, Vol. 6, No. 11, pp. 1905–1910 (11/1967). [350-3.5]

*Primary Examiner*—David Schonberg
*Assistant Examiner*—Robert L. Sherman
*Attorney*—Michael S. Striker

ABSTRACT: A photosensitive layer is exposed by a first light wave field having random phase distribution with peaks and valleys representing different amounts of exposing light, whereupon the exposed layer is developed and treated to reduce the differences between the lengths of the optical path so that they are less than half of the wavelength of light and so that a laser beam passing through the layer forms a second wave field having a substantially constant amplitude and a locally varying phase. This wave field can be used for illuminating a transparent picture so that the same forms a holographic recording on a photographic plate when a reference beam of coherent light is directed at an angle at the photographic plate.

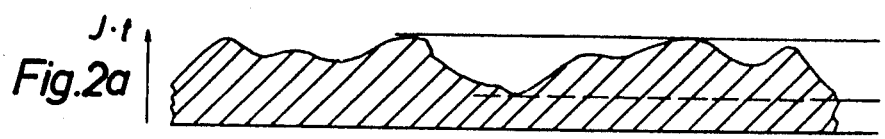
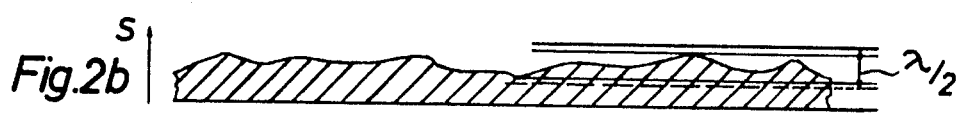
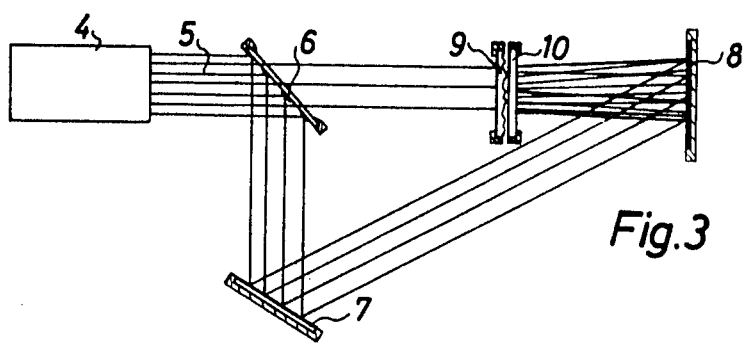
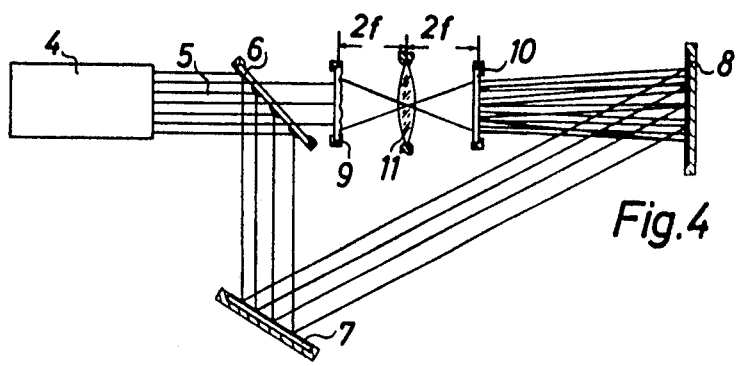

METHOD OF MAKING A DIFFUSING LAYER

BACKGROUND OF THE INVENTION

The present invention is concerned with the generation of a light wave field which has at least one area or zone, a substantially constant light amplitude, but a locally varying phase. Light wave fields of this type are required for holographic recordings of transparent photographic pictures which cause difficulties when penetrated by light having very great lengths of coherence. When a diffuser is used together with a source for light of great coherent length, for example a laser, due to the spatially statistically distributed amplitude and phase, a stationary graining in the distribution of the light intensity results, which is sometimes called "granulation."

If together with a laser, a system of condenser lenses is used, the spherical or planar light wave fields are subjected to interference with secondary wave fields when passing through the objective which forms an image. Such secondary wave fields are caused by dust, scratches, and like damage, so that the images are superimposed by disturbing ring systems.

SUMMARY OF THE INVENTION

It is one object of the invention to provide an illuminating system avoiding the disadvantages of the prior art.

Another object of the invention is to provide a diffusing arrangement producing a light wave field having a substantially constant amplitude and locally varying phase.

Another object of the invention is to produce such a light wave field by an exposed and treated photographic layer.

Another object of the invention is to provide a method by which a photosensitive layer is transformed into a diffusing layer whose thickness varies less than one-half of the wavelength of light.

With these objects in view, the present invention relates to an arrangement for producing a light wave field of the above-described type by means of a photographically produced diffusing plate or layer, which, when still in photosensitive condition, is exposed to record a section through a first wave field of random local phase distributions, whereupon the photographic exposed layer is treated so that the amplitude differences caused by the exposing wave field are eliminated, and the differences between the lengths of the optical paths within the diffusing layer are, in the direction in which light penetrates the layer, less than half the wavelength of light.

A diffusing layer of this type causes, due to the different lengths of the optical paths, at a certain distance from an object an uneven illumination of the same, but in the direct proximity of the diffusing layer, or of an image of the same, no interference effects can occur, so that the disturbances explained above cannot take place.

A diffusing arrangement according to one embodiment of the invention comprises a source for emitting a beam of substantially coherent light in one direction, and diffusing means located in the beam of light, and having a developed photographic layer penetrated by the coherent light and having peaks and valleys of different lengths of the optical path whose heights differ less than half the wavelength of light.

The diffusing means is preferably made by exposing the photosensitive layer by a first light wave field having random phase distribution so that the layer has different portion, such as peaks and valleys, representing different amounts of exposing light, and developing and treating the exposed layer to effect differences in the lengths of the optical path of said portions which are less than half the wavelength of light.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2a is a diagrammatic section of the exposed layer wherein ordinal distances represent amounts of exposing light and degrees of blackening;

FIG. 2b is a schematic sectional view of the layer after development and treatment wherein ordinal distances represent the lengths of the optical paths in the layer;

FIG. 3 is a schematic view illustrating a first embodiment of the invention for making a holographic recording by means of the diffusing arrangement of the invention; and FIG. 4 is a schematic view illustrating a second embodiment, including a lens, for making a holographic recording by means of the diffusing arrangement of the invention.

DESCRIPTION OF THE PREFERRED EMBODIMENTS

Figure 1:
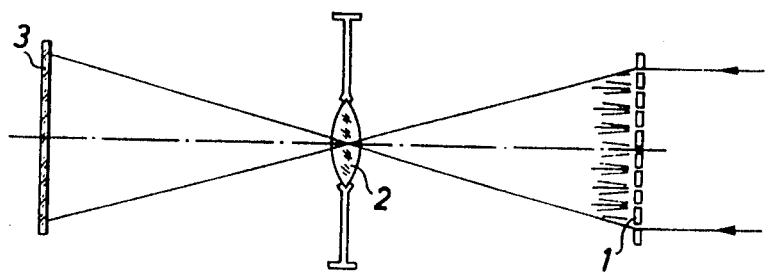
FIG. 1 is a schematic sectional view illustrating apparatus for exposing a photosensitive layer.

Referring first to FIG. 1, a conventional diffuser 1, which may be a frosted plate, a grid plate, a fabric, or the opening of an Ulbricht sphere, is illuminated by parallel light produced by a laser, and imaged by an objective lens 2 on a photosensitive layer 3.

The intensity and exposure time of the photosensitive layer 3 are selected so that by a following development and bleaching of the exposed photosensitive layer 3, the amplitude differences caused by the nonuniformity of the exposing wave field can be eliminated, so that the differences between the length of the optical paths within the layer 3 in the direction of the penetrating light rays, is smaller than half the wavelength of light.

FIG. 2a illustrates in ordinal direction the amounts of light impinging different portions of the photosensitive layer 3 during exposure. The amount of light is I.t, which is intensity of the light multiplied by exposure time. The ordinates in FIG. 2 also represent the amount of blackening which, aside from minor differences caused by the Schwarzschild effect, corresponds to the amount of light.

The elimination or reduction of the amplitude differences, and the obtaining of the desired differences between the length of the path of the light, is obtained by treating the exposed layer 3 with so-called bleaching baths, which contain in addition to a carrier for a halogen, such as NaCl, HCl or KBr, also contains ammonium dichromate as refining agent for the gelatine of the layer. The chlor mainly serves the purpose of transforming the metallic silver formed in the layer 3 into a dielectric material which does not absorb light, and has an index of refraction different from the index of refraction of the remainder of the layer, for example, a silver halogenid inner relief. The refining of the gelatine of the photographic layer causes a surface or outer relief according to the former blackening of the layer, which causes different lengths of the optical paths. The magnitude of these differences, caused by the outer and inner reliefs, depends on the duration of the bleaching treatment and the initial blackening of the photographic layer. In this manner, by regulating and controlling the exposing and bleaching, the magnitude of the differences between the length of the optical path can be limited to the desired maximum of half the wavelength of light.

FIG. 2b schematically shows the treated photographic layer whose peaks and valleys are reduced by the bleaching treatment and are less than half the wavelength λ, as schematically shown in FIG. 2b. The maximum difference of the optical paths of light, penetrating layer 3 perpendicularly to the same, is less than half the wavelength of light.

A diffusing layer made by the above-described method of the invention, together with a source of coherent light, can be used for illuminating a transparent photographic picture or object of which the holographic recording is to be made.

In the embodiment of FIG. 3, a laser 4 emits a beam of coherent light 5 which is divided by a dichroic mirror 6 into an object beam and a reference beam which is reflected by a mirror 7 onto a photographic plate 8 at a predetermined angle to the direction of the object beam 5. Rays of beam 5 passing through the dichroic mirror 6 pass through the diffusing layer 9, which corresponds to the developed and treated photographic layer 3, and the diffused light illuminates the transparent photographic picture 10 which is imaged on the photographic plate 8 so that, together with the reference beam, a holographic recording is produced. Due to the effect of the diffusing layer 9 in accordance with the invention, a holographic recording substantially free of grain can be obtained on the photographic plate 8. The best effects are obtained when the diffusing layer 9 is in contact with the transparent object 10, which has a photographic picture thereon.

FIG. 4 illustrates an embodiment in which the diffusing layer 9 is not in contact with the transparent object 10. Corresponding parts are indicated in FIGS. 3 and 4 by like reference numerals. The laser 4 produces a beam 5 which is divided into an object beam and a reference beam by the dichroic mirror 6 and the mirror 7. The object beam passing through dichroic mirror 6 impinges the diffusing layer 9 and the light wave field on its surface is imaged by a lens 11 on the surface of the transparent object 10. Light passing through the same impinges, together with the reference beam, the photographic plate 8 so that a holographic recording is formed on the same. Lens 11 has a focal length $f$ and is spaced from the diffusing layer 9 the distance $2f$, and from the transparent object 10 also the distance $2f$. Consequently, the light wave field on the surface of diffusing layer 9 is imaged in the ratio 1:1 at the same size on the transparent object 10.

The embodiment of FIG. 4 has the advantage that no scratching can occur as in the embodiment of FIG. 3 in which the diffusing plate 9 is in contact with the transparent object 10.

It will be understood that each of the elements described above, or two or more together, may also find a useful application in other types of diffusing arrangements differing from the types described above.

While the invention has been illustrated and described as embodied in a diffusing arrangement comprising a photographic layer exposed, developed and treated to have specific diffusing properties, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Method of making a diffusing layer comprising exposing a photosensitive layer by a first light wave field having random phase distribution so that said layer has different portions representing different amounts of exposing light; and developing and treating said exposed layer so as to effect differences in the length of the optical path of said portions which are less than half of the wavelength of light so that coherent light passing through said layer forms a second light wave field having a substantially constant amplitude and a locally varying phase.

2. The method of claim 1 comprising the step of producing said first light wave field by illuminating a diffuser.

3. The method of claim 1 wherein said layer is treated after development to transform a substance therein into a dielectric material having an index of refraction different from the index of refraction of the remainder of said layer in which said material is embedded.

4. The method of claim 3 wherein said substance is silver.

5. The method of claim 1 wherein the exposure of said layer causes the formation of peak portions and valley portions thereon those heights represent different amounts of exposing light and different degrees of blackening; and wherein said layer is treated after development to reduce the differences between the heights of said peak and valley portions to less than half the wavelength of light.

6. The method of claim 5 wherein said first wave field is produced by illuminating a diffuser; wherein said layer contains silver; and wherein said layer is treated after development to transform the silver therein into a dielectric material having an index of refraction different from the index of refraction of the remainder of said layer.

* * * * *